US005270103A

United States Patent [19]

Oliver et al.

[11] Patent Number: 5,270,103

[45] Date of Patent: Dec. 14, 1993

[54] COATED RECEIVER SHEETS

[75] Inventors: John F. Oliver, Mississauga; Richard E. Sandborn, Toronto, both of Canada

[73] Assignee: Xerox Corporation, Stamford, Conn.

[21] Appl. No.: 616,466

[22] Filed: Nov. 21, 1990

[51] Int. Cl.[5] ........................ B32B 5/16; B32B 23/08; B05D 3/12

[52] U.S. Cl. .................................... 428/219; 428/323; 428/331; 428/412; 428/335; 428/419; 428/483; 428/513; 428/518; 428/520; 427/391; 427/392; 427/361; 162/135; 162/136

[58] Field of Search ............... 428/219, 323, 331, 335, 428/483, 419, 518, 520, 513; 427/391, 392, 361; 162/135, 136

[56] References Cited

U.S. PATENT DOCUMENTS

| | | | |
|---|---|---|---|
| 4,304,815 | 12/1981 | Cugasi, Jr. | 428/280 |
| 4,474,847 | 10/1984 | Schröder et al. | 428/323 |
| 4,478,910 | 10/1984 | Oshima et al. | 428/331 |
| 4,554,181 | 11/1985 | Cousin et al. | 427/261 |
| 4,617,239 | 10/1986 | Marauyama et al. | 428/452 |
| 4,751,111 | 6/1988 | Lee et al. | 428/514 |
| 4,758,461 | 7/1988 | Akiya et al. | 428/212 |
| 4,780,356 | 10/1988 | Otouma et al. | 428/212 |

FOREIGN PATENT DOCUMENTS

| | | | |
|---|---|---|---|
| 0189481 | 9/1985 | Japan | 428/514 |

*Primary Examiner*—P. C. Sluby
*Attorney, Agent, or Firm*—Judith L. Byorick

[57] ABSTRACT

Disclosed is a receiver sheet which comprises a substrate and a coating which comprises a pigment and a binder comprising polyvinyl alcohol and an additional binder component selected from the group consisting of styrene-butadiene latices, cationic polyamines, cationic polyacrylamides, cationic polyethyleneimines, styrene-vinyl pyrrolidone copolymers, styrene-maleic anhydride copolymers, polyvinyl pyrrolidone, vinyl pyrrolidone-vinyl acetate copolymers, and mixtures thereof. When the receiver sheet is a coated paper, the paper substrate has a Hercules sizing degree of at least about 50 seconds and a basis weight of less than about 90 grams per square meter. When the receiver sheet is a transparency, the substrate is substantially transparent. The receiver sheet is particularly suitable for printing with aqueous based inks, such as those employed in ink jet printing systems.

24 Claims, No Drawings

COATED RECEIVER SHEETS

BACKGROUND OF THE INVENTION

The present invention is directed to coated receiver sheets, such as papers and transparencies. More specifically, the present invention is directed to coated receiver sheets suitable for use with aqueous-based inks such as those employed in ink jet printing. In one embodiment, the receiver sheet is a paper which comprises a substrate having a Hercules sizing degree of at least about 50 seconds and a basis weight of less than about 90 grams per square meter, and a coating which comprises a pigment and a binder comprising polyvinyl alcohol and an additional binder component selected from the group consisting of styrene-butadiene latices, cationic polyamines, cationic polyacrylamides, cationic polyethyleneimines, styrene-vinyl pyrrolidone copolymers, styrene-maleic anhydride copolymers, polyvinyl pyrrolidone, vinyl pyrrolidone-vinyl acetate copolymers, and mixtures thereof. In another embodiment, the receiver sheet is a transparency comprising a substantially transparent substrate and a coating which comprises a pigment and a binder comprising polyvinyl alcohol and an additional binder component selected from the group consisting of styrene-butadiene latices, cationic polyamines, cationic polyacrylamides, cationic polyethylenelmines, styrene-vinyl pyrrolidone copolymers, styrene-maleic anhydride copolymers, polyvinyl pyrrolidone, vinyl pyrrolidone-vinyl acetate copolymers, and mixtures thereof. Receiver sheets according to the present invention exhibit particular advantages when employed in ink jet printing processes in that they exhibit uniform solid area colors, reduced bi-directional color banding in mixed primary colors, waterfastness, reduced inter-color mixing with neighboring colors, high optical density, improved coating adhesion to the substrate with less chalking, and, in the case of papers, a more plain paper-like feel.

Ink jet printing systems generally are of two types: continuous stream and drop-on-demand. In drop-on-demand systems, a droplet is expelled from an orifice directly to a position on a recording medium in accordance with digital data signals. A droplet is not formed or expelled unless it is to be placed on the recording medium. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

Ink jet printers of the continuous stream type employ printheads having one or more orifices or nozzles from which continuous streams of ink droplets are emitted and directed toward a recording medium. The stream is perturbed, causing it to break up into droplets at a fixed distance from the orifice. Printing information is transferred to the droplets of each stream by electrodes that charge the passing droplets, which permits each droplet to be individually charged so that it may be positioned at a distinct location on the recording medium or sent to the gutter for recirculation. As the droplets proceed in flight from the charging electrodes toward the recording medium, they are passed through an electric field which deflects each individually charged droplet in accordance with its charge magnitude to specific pixel locations on the recording medium. The continuous stream ink jet printing process is described, for example, in U.S. Pat. No. 4,255,754, U.S. Pat. No. 4,698,123, and U.S. Pat. No. 4,751,517, the disclosures of each of which are totally incorporated herein by reference.

Papers coated with materials compatible with ink jet inks are known. For example, U.S. Pat. No. 4,478,910 (Oshima et al.) discloses an ink jet recording paper comprising a base sheet with a Stöckigt sizing degree of less than 4 sec. (based on a basis-weight of 60 g/m$^2$) and a coating layer comprising a water-soluble polymeric binder and fine silica particles having a specific surface area of more than 200 m$^2$/g as measured by the BET method and a uniformity number n of the Rosin-Rammler distribution of greater than 1.10. The polymeric binder may include polyvinyl alcohol or its derivatives, water soluble cellulose derivatives, water soluble polymeric substances such as polyvinyl pyrrolidone, or the like.

U.S. Pat. No. 4,758,461 (Akiya et al.) discloses a recording paper suitable for ink-jet printing comprising a fibrous substrate paper on the surface of which a silicon containing type pigment and a fibrous material of the substrate paper are present in a mixed state, said recording paper having a Stöcklgt sizing degree of from 0 to 15 sec. and a basis weight of from 90 to 200 g/m$^2$. The paper can also contain an aqueous binder such as one or a mixture of two or more water-soluble or water-dispersed polymers such as polyvinyl alcohol, starch, oxidized starch, cationized starch, casein, carboxymethyl cellulose, gelatin, hydroxyethyl cellulose, SBR latex, MBR latex, vinyl acetate emulsion, and the like.

U.S. Pat. No. 4,780,356 (Otouma et al.) discloses a recording sheet suitable for ink jet printing comprising a sheet of paper and porous particles on the paper surface, wherein the particles have an average pore size of from 10 to 5,000 Angstroms, a pore volume of from 0.05 to 3.0 cc/g and an average particle size of from 0.1 to 50 microns. The particles can be coated on a paper surface by means of a binder such as polyvinyl alcohol.

U.S. Pat. No. 4,474,847 (Schroder et al.) discloses a coated base paper for use in ink jet recording process wherein the coating comprises a pigment and/or filler of non-flake structure and a binding agent dried on the paper. The pigment content is at least about 90 percent by weight of the dried coating and has a particle mean diameter of about 0.05 to 4.0 microns, and the binding agent is predominantly hydrophilic.

U.S. Pat. No. 4,554,181 (Cousin et al.) discloses an ink jet recording sheet having a recording surface which includes a combination of a water soluble polyvalent metal salt and a cationic polymer, said polymer having cationic groups which are available in the recording surface for insolubilizing an anionic dye.

U.S. Pat. No. 4,304,815 (Cugasi, Jr.) discloses an aqueous release coating composition for application to substrates, wherein the coating has low absorption to the substrate, excellent adhesion to the substrate, and easy and quick release and removal from the substrate. The coating comprises from about 3 to about 8 percent polyvinyl alcohol, from about 9 to about 35 percent clay, from about 5 to about 12 percent of an adhesive binder, and from about 49 to about 75 percent water. The clay can be any of variously colored natural mixtures of silica and alumina as well as occasional amounts of oxides of magnesium, calcium, and potassium having a particle size range of from about ¼ micron to about 4 microns. The adhesive binder can be substantially any commercially available synthetic thermoplastic homopolymer, copolymer or terpolymer having the necessary adhesive properties, chemical stability, and the like, such as polyvinyl acetate homopolymers and copolymers, polyvinyl chloride-polyvinyl acetate copolymers, polyvinyl acetate-acrylic copolymers, and the like.

U.S. Pat. No. 4,617,239 (Maruyama et al.) discloses a method of coating paper to improve its surface strength and printability by applying to the paper a silicon-containing modified polyvinyl alcohol agent or its saponification product. The coating agent forms a film on the surface of the paper which minimizes the penetration of the coating into the paper and improves the surface strength and printability of the paper. The coating agent may be incorporated with other coating compounds, including synthetic resin emulsions such as styrene-butadiene latex, polyacrylate ester emulsion, polyvinyl acetate emulsion, vinyl acetate-acrylate ester copolymer emulsion, and vinyl acetate-ethylene copolymer emulsion. Further, the coating agent may be incorporated with pigments such as clay, calcium carbonate, titanium dioxide, satin white, zinc oxide, silica, aluminum oxide, and cadmium sulfide.

Copending application U.S. Ser. No. 07/616,971, entitled "Carbonless Paper for Ink Jet Printing," inventors John F. Oliver, Richard E. Sandborn, and David J. Sanders, filed Nov. 21, 1990), the disclosure of which is totally incorporated herein by reference, discloses a process for generating images which comprises (1) incorporating into an ink jet printing apparatus a carbonless paper set which comprises a first sheet comprising a support containing a color developer capable of reacting with a color former to produce a color image, said color developer comprising high surface area silica particles, and a second sheet comprising a support coated with the color former; (2) forming an image on the first sheet by causing ink to be expelled in droplets on a surface containing the color developer; and (3) forming an image on the second sheet by causing ink to be expelled in droplets onto the surface opposite to that coated with the color former.

Although known compositions are suitable for their intended purposes, a need remains for coated receiver sheets suitable for use with aqueous-based inks. In addition, there is a need for coated receiver sheets suitable for color ink jet printing processes. A need also exists for coated receiver sheets that enable uniform solid printed areas. Further, there is a need for coated receiver sheets that exhibit reduced bi-directional color banding in mixed primary colors. There is also a need for coated receiver sheets with high degree of waterfastness. A need also exists for coated receiver sheets with reduced inter-color mixing of neighboring colors. In addition, there is a need for coated receiver sheets that enable prints with improved optical density and color saturation. Further, there is a need for coated receiver sheets that exhibit improved coating adhesion with less chalking. There is also a need for coated papers with a texture that resembles that of plain paper to the touch.

SUMMARY OF THE INVENTION

It is an object of the present invention to provide coated receiver sheets suitable for use with aqueous-based inks.

It is another object of the present invention to provide coated receiver sheets suitable for color ink jet printing processes.

It is yet another object of the present invention to provide coated receiver sheets that enable uniform solid printed areas.

It is still another object of the present invention to provide coated receiver sheets that exhibit reduced bi-directional color banding in mixed primary colors.

Another object of the present invention is to provide coated receiver sheets with high degree of waterfastness.

Yet another object of the present invention is to provide coated receiver sheets with reduced inter-color mixing of neighboring colors.

Still another object of the present invention is to provide coated receiver sheets that enable prints with improved optical density and color saturation.

It is another object of the present invention to provide coated receiver sheets that exhibit improved coating adhesion with less chalking.

It is yet another object of the present invention to provide coated papers with a texture that resembles that of plain paper to the touch.

These and other objects of the present invention (or specific embodiments thereof) can be achieved by providing a paper which comprises a substrate having a Hercules sizing degree of at least about 50 seconds and a basis weight of less than about 90 grams per square meter, and a coating which comprises a pigment and a binder comprising polyvinyl alcohol and an additional binder component selected from the group consisting of styrene-butadiene latices, cationic polyamines, cationic polyacrylamides, cationic polyethyleneimines, styrene-vinyl pyrrolidone copolymers, styrene-maleic anhydride copolymers, polyvinyl pyrrolidone, vinyl pyrrolidone-vinyl acetate copolymers, and mixtures thereof. Another embodiment of the present invention is directed to a transparency which comprises a substantially transparent substrate and a coating which comprises a pigment and a binder comprising polyvinyl alcohol and an additional binder component selected from the group consisting of styrene-butadiene latices, cationic polyamines, cationic polyacrylamides, cationic polyethyleneimines, styrene-vinyl pyrrolidone copolymers, styrene-maleic anhydride copolymers, polyvinyl pyrrolidone, vinyl pyrrolidone-vinyl acetate copolymers, and mixtures thereof.

DETAILED DESCRIPTION OF THE PREFERRED EMBODIMENTS

The receiver sheets of the present invention comprise a substrate and a coating. For paper receiver sheets, the substrate typically is a highly sized paper, with a Hercules sizing degree of at least about 50 seconds, and preferably from about 500 to about 1,000 seconds. Sizing refers to water resistance, which is endowed to a cellulosic paper structure by hydrophobic internal or external treatments during paper making, such as the addition of rosin acids and starch. Typically, sizing is expressed in terms of the time taken for a given volume of a water-based liquid to penetrate the paper structure. World wide, several standard methods have been adopted. In North America, the Hercules sizing test is the one most commonly used. Another sizing standard is the Stöckigt sizing degree. Generally, under the Stöckigt standard, a paper with a Stöckigt sizing degree of 15 seconds or less has a low degree of sizing. Papers suitable for the present invention generally are moderately or highly sized, and typically have a Stöckigt sizing degree of at least about 30 seconds. The sized substrate is believed to enable minimized penetration of the coating into the substrate paper, resulting in a distinct pigmented coating on the paper surface as opposed to a coating that has penetrated the paper fibers to a significant degree. Non-penetration of the coating into the substrate enables advantages for color ink jet printing, such as providing a microscopically smooth surface affording symmetric spreading and negligible feathering of ink images, high and uniform optical density, high color saturation, rapid ink absorption, and minimum inter-color bleed of juxtaposed solid areas. The basis weight of the substrate paper of the present invention generally is less than about 90 grams per square meter, preferably less than 80 grams per square meter, and more preferably from about 60 to about 85 grams per square meter. Basis weight is a measure of paper density, and typically is expressed in terms of mass of fibers and sundry materials per unit area of a formed paper sheet. In the papermaking process, the pulp fiber consistency, degree of drainage during forming, extent of fiber consolidation during wet pressing and subsequently calendering, primarily determine the resultant basis weight of the paper. Examples of suitable substrate papers include Domtar Diazo paper, available from Domtar Limited, Montreal, Canada (basis weight 71.5 grams per square meter, Hercules sizing degree of about 900 seconds), dielectric base stock papers available from James River Coproration, Neenah, Wis. and Champion International, Courtland, Ala., and the like.

For transparency receiver sheets, any suitable substantially transparent substrate can be employed. Examples of suitable materials include polyester, including Mylar TM, available from E. I. du Pont de Nemours & Company, Melinex TM, available from Imperial Chemicals, Inc., Celanar TM, available from Celanese Corporation, polycarbonates such as Lexan TM, available from General Electric Company, polysulfones, cellulose triacetate, polyvinylchloride, cellophane, polyvinyl fluoride, and the like, with polyester such as Mylar TM being preferred in view of its availability and relatively low cost.

The coating for the receiver sheet of the present invention generally comprises a pigment and a binder comprising polyvinyl alcohol and one or more additional binder materials. The pigment generally is a silica, such as a colloidal hydrogel type amorphous silica, such as Syloid 74, available from Grace-Davison and Ludox SM available from E. I. du Pont de Nemours & Company, fumed amorphous silica, such as Aerosil 380 available from Degussa AG, Frankfurt, FRG, and the like. Also suitable are other high surface area pigments, such as sodium aluminum silicate (Zeolex 7A, available from J. M. Huber Corporation, for example), precipitated silica (such as Zeo 49, available from J. M. Huber Corporation, for example), calcium silicate (XP 974 and CH427-97-8 , available from J. M. Huber Corporation, or Microcel T38, available from Johns Manville, for example), or the like. The pigment generally has a high surface area, typcially from about 250 to about 400 square meters per gram, and preferably from about 300 to about 380 square meters per gram. The pigment is present in the coating composition in an effective amount, typically from about 60 to about 75 percent by weight, with the binder typically being present in an amount of from about 25 to about 40 percent by weight.

The polyvinyl alcohol component of the binder generally is hydrolized, preferably to at least 87 percent and more preferably to at least 99 percent. The polyvinyl alcohol preferably has a number average molecular weight of from about 10,000 to about 190,000, and more preferably from about 30,000 to about 130,000. Examples of polyvinyl alcohols suitable for the coatings of the present invention include Vinol 350, a 98.0 to 98.9 percent fully hydrolyzed high number average molecular weight (124,000–186,000) polymer, Vinol 205, an 87.0 to 89.0 percent partially hydrolyzed low number average molecular weight (31,000–51,000) polymer, and Vinol 523, an 87.0 to 89.0 percent partially hydrolyzed medium number average molecular weight (85,000–146,000) polymer, all available from Air Products, polyvinyl alcohols such as the Gelvatols available from E. I. du Pont de Nemours & Company, and the like. The polyvinyl alcohol is present in the binder in an effective amount, typically from about 40 to about 55 percent by weight of the binder.

The additional binder material or materials in the coating compositions for the receiver sheets of the present invention, when present in combination with the pigment and polyvinyl alcohol, impart to the receiver sheet improvements in characteristics such as optical density, adhesion of the coating to the substrate, reduced chalking, a more plain paper-like feel, waterfastness, and uniform solid area colors. The receiver sheets of the present invention also exhibit improvements with respect to multi-color ink jet printing, such as reduced bi-directional color banding in mixed primary colors and reduced inter-color mixing of neighboring colors. The additional binder can be a styrene-butadiene latex, a cationic polyamine, a cationic polyacrylamide, a cationic polyethyleneimine, a styrene-vinyl pyrrolidone copolymer, a styrene-maleic anhydride copolymer, a polyvinyl pyrrolidone, or a vinyl pyrrolidone-vinyl acetate copolymer, and can also constitute a mixture of two or more of these materials.

Suitable styrene-butadiene latices are characterized by permitting uniform rheological behavior in high solids coating applications and yielding coatings with high substrate adhesion and wet and dry surface integrity. More specifically, latices fulfilling these requirements include carboxylated styrene-butadiene derivatives containing 50 percent or more bound styrene comprising approximately 20 percent or more microgel structure of number average molecular weight 4,000,000 and 70 percent or more macrogel of number average molecular weight greater than 4,000,000. Examples of suitable styrene-butadiene latices include Polysar Latex 478, a carboxylated styrene-butadiene latex available from Polysar Limited, STYRONAL ND 478, a carboxylated styrene-butadiene latex available from BASF Canada Inc., Sarnia, Canada, and the like.

Suitable cationic polymers are those with a high cationic charge to molecular weight ratio. More specifically, suitable cationic polymers include, but are not limited to, cationic polyamines, such as those of the type poly (2-hydroxpropyl-1, 1-N-dimethylammonium chloride, which are relatively insensitive to pH variations compared with other cationic polymers. Examples of suitable cationic polyamines of this formula include Cypro 514 Promoter, with an average molecular weight of 100,000, available from American Cyanamid Company. An additional example of a suitable polyamine is polydimethyldiallylammonium chloride, such as Nalkat 8674, available from Alchem Inc., Burlington, Ontario. Other examples of suitable cationic polymers include cationic polyacrylamides, such as Praestol K155L, available from Bayer Canada Inc., and cationic polyethyleneimine, such as Polymin SK, available from BASF Canada Inc.

Any suitable styrene-vinyl pyrrolidone copolymer can be employed. One example of a suitable styrene-vinyl pyrrolidone copolymers is Antara 430, a copolymer derived from styrene and vinylpyrrolidone, available from GAF Corporation, Wayne, N.J.

Suitable styrene-maleic anhydride copolymers generally have a number average molecular weight of about 50,000 and about a 1 to 1 mole ratio of styrene to maleic anhydride. One example of a suitable styrene-maleic anhydride copolymer is Monsanto Scripset 720, available from Monsanto.

suitable polyvinyl pyrrolidones generally have a number average molecular weight of about 40,000. One example of a suitable polyvinyl pyrrolidone is GAF K30, available from GAF Corporation. Polymers of somewhat lower and higher molecular weight, such as GAF K15 and GAF K60, can also be used.

Any suitable vinyl pyrrolidone-vinyl acetate copolymers can be used. One example of a suitable vinyl pyrrolidone-vinyl acetate copolymer is GAF E-635, available from GAF Corporation, with a 1 percent ethanol solution viscosity (Fikentscher's) K-value between 30 and 50.

The additional binder material or materials are present in the binder in any effective amount. Generally, the total amount of additional binder present in the binder is from about 45 to about 60 percent by weight of the binder.

Coating compositions for the receiver sheets of the present invention can be prepared by first adding the pigment to water, for example in an amount of about 10 grams of water per one gram of pigment, in a vessel from which air bubbles can easily escape. For example, the pigment can be added to water by mixing under moerate slurrying action with a paddle stirrer in a container such as a stainless steel beaker affording a relatively large surface area. A solution of polyvinyl alcohol in water, generally in a concentration amount of from about 8 to about 10 percent by weight solids, is heated at a temperature of from about 90° to about 95° C. for about 30 minutes and is then added to the dispersion of pigment particles in water, followed by stirring and subsequently adjusting the pH of the mixture from about 8.0 to about 8.5. Subsequent to adjustment of the pH, the additional binder material or materials are added and stirred, followed by addition of any further additives such as surfactants, and the pH is again adjusted from about 8.0 to about 8.5. Further minor adjustments through the addition of water may occasionally be necessary to optimize the applied coating thickness and its rheology. The final coating composition generally has a water content of from about 10 to about 40 percent by weight.

The coating can be applied to the substrate by any suitable process, such as blade coating, knife coating, wire-wound rod coating, or any other suitable coating technique. The solution of water and coating composition can have any desired solids content; for example, for the coating techniques employed in the examples below, a solids content of from about 15 to about 25 percent by weight in water is suitable. Other coating methods may have different optimal solids contents. The coating can be applied in any effective thickness or coating weight. Typically, the coating is at a coating weight of from about 5 to about 15 grams per square meter, and preferably from about 7 to about 11 grams per square meter. The dry coating thickness can be of any desired value, with typical values being from about 10 to about 30 microns, and preferably from about 15 to about 25 microns. Subsequent to coating, the receiver sheet is dried by any suitable process, such as exposure to ambient air conditions, drying with a hot air gun blow drier (typically at coating surface temperatures of 100° B. or less), or the like.

Coated receiver sheets of the present invention are suitable for ink jet printing processes. One embodiment of the present invention is directed to a process for generating images which comprises (1) incorporating into an ink jet printing apparatus a coated paper which comprises a substrate having a Hercules sizing degree of at least about 50 seconds and a basis weight of less than about 90 grams per square meter, and a coating which comprises a pigment, polyvinyl alcohol, and a component selected from the group consisting of styrene-butadiene latices, cationic polymers, styrene-vinyl pyrrolidone copolymers, styrene-maleic anhydride copolymers, polyvinyl pyrrolidone, vinyl pyrrolidone-vinyl acetate copolymers, and mixtures thereof; and (2) forming an image on the paper by causing ink to be expelled in droplets onto the coated surface. A similar process is employed to generate images on transparencies of the present invention. The coated receiver sheets of the present invention are also particularly suitable for color ink jet printing, wherein droplets of ink of one color are first expelled onto the coated surface in imagewise fashion, followed by expulsion of droplets of ink of another color onto the coated surface in imagewise fashion. Images of different colors can be separated by unimaged areas of the receiver sheet, adjacent to each other, overlapping to form secondary colors.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A coating composition was prepared as follows. To 400 milliliters of water in a stainless steel vessel was added 74 grams of Syloid 74×5500 silica particles having an average particle size of 6.0 microns and a surface area of 340 meters per gram (available from W. R. Grace & Company, Davison Chemical Division, Baltimore, Md.) The coating mixture was mixed with a paddle stirrer at moderate speeds to ensure homogeneous dispersion and the discharge of air bubbles. An aqueous stock solution of 50 percent by weight solids of Vinol 350 polyvinyl alcohol with an average molecular weight of 108,000 and a 98.5 percent degree of hydrolysis (available from Air Products & Chemicals Inc, Allentown, Pa.) was heated to a temperature of 90° to 95° C. for 30 minutes and was subsequently cooled, and 27 grams of the solution was added with stirring to the dispersion of silica particles in water. Thereafter, the pH of the resulting mixture was adjusted to between 8.0 and 8.5 by the addition of about 2.5 milliliters of 1 Molar aqueous sodium hydroxide. Subsequently, 1 gram of CYPRO 514, a cationic polyamine of the type poly(2-hydroxy-propyl-1,1-N-dimethylammonium chloride), with an average molecular weight of 108,000 (available from Cyanamid Canada Inc, Niagara Falls, Ontario) was added with stirring to the mixture. When addition of the polyquaternary amine was complete, 22 grams of Styronal ND 478, a carboxylated Styrenebutadiene latex (available from Polysar Ltd., Sarnia, Ontario) was added with stirring to the mixture. Subsequently, 0.5 gram of Triton X-100, an isooctylphenoxypolyethoxy ethanol surfactant (available from Rohm and Haas, Inc., Philadelphia, Pa.) was added with stirring to the mixture and the pH was thereafter further adjusted to between 8.0 and 8.5 by the addition of a few milliliters of 1 Molar sodium hydroxide.

The coating composition thus formed was applied with a #12 wire-wound Meyer rod onto Domtar Diazo paper (available from Domtar Ltd., Montreal, Quebec) with a basis weight of 71.5 grams per square meter and a Hercules sizing degree of about 900 seconds in a coating weight of 7 grams per square meter. The coating was then dried for about 1 minute with a hot air-gun blow drier such that the coating surface temperature was less than or equal to 100° C.

The coated paper thus formed was then incorporated into a Xerox® 4020 piezo-electric transducer-based color ink jet printer with 240 by 120 (horizontal/vertical) spots per inch resolution. A bi-directional color test pattern comprising adjacent blocks of black and three primary colors (cyan, magenta, and yellow) was printed in solid areas with 100 percent coverage and in three secondary color overlapping areas (mixed primary colors of green, red, and violet) in solid areas with 200 percent coverage. For comparison purposes, the same test pattern was printed onto a commercially available ink jet paper (Pro-Tech Ink Jet Ultra, available from James River Corporation, Groveton, N.H.). Reflectance optical density measurements of the individual colors were measured with a Tobias Associates Inc. Model No. RCX densitometer. Reflectance optical density data for the test patterns printed on these two papers were as follows:

| | Example I | Pro-Tech Ink Jet Ultra |
|---|---|---|
| Black | 1.58 | 1.47 |
| Cyan | 1.42 | 1.38 |
| Magenta | 0.91 | 0.91 |
| Yellow | 0.87 | 0.87 |

As the data indicate, the paper of the present invention resulted in color prints of improved print quality performance with optical density equal to or greater than that observed for the commercially available paper. The prints generated on the experimental papers of the present invention also exhibited more highly uniform solid area colors free of bi-directional banding and no intercolor bleeding of neighboring composite and primary colors, compared with the commercially available paper.

EXAMPLE II

A coating composition was prepared as described in Example I except that 15 grams of the cationic polyamine were used, with the proportions of the other ingredients remaining the same. The coating composition thus formed was applied with a #8 wire-wound Meyer rod onto Domtar Diazo paper in a coating weight of about 4 grams per square meter.

The coated paper thus formed was then incorporated into a Hewlett-Packard HP Paintlet color ink jet printer, which employs thermal bubble-type drop generation with a resolution of 180 spots per inch. A bi-directional color test pattern comprising adjacent blocks of black and three primary colors (cyan, magenta, and yellow) was printed in solid areas with 100 percent coverage and in three secondary color overlapping areas (mixed primary colors of green, red and violet) in solid areas with 200 percent coverage. For comparison purposes, the same test pattern was printed onto the coated fanfold ink jet paper supplied with the HP Paintlet printer. Reflectance optical density measurements of the individual colors were measured with a Tobias Associates Inc. Model No. RCX densitometer. Reflectance optical density data for the test patterns printed on these two papers were as follows:

| | Example II | HP Paintlet |
|---|---|---|
| Black | 1.68 | 1.50 |
| Cyan | 1.55 | 1.46 |
| Magenta | 1.01 | 0.95 |
| Yellow | 0.90 | 0.86 |

As the data indicate, the paper of the present invention resulted in prints with optical density significantly greater than that observed for the commercially available paper. In addition, the prints generated on the papers of the present invention exhibited more uniform solid area colors free of bi-directional banding, and no inter-color bleeding of neighboring composite and primary colors, and primary colors, as compared with the commercially available paper. In addition, the prints generated on the paper of the present invention were completely waterfast for all colored inks.

EXAMPLE III

Additional coating compositions of the present invention were prepared as follows.

SAMPLE A: A primary binder system comprising 4 parts by weight low molecular weight polyvinyl alcohol (Vinol 205, available from Air Products & Chemical Inc., Allentown, Pa.) to 1 part by weight medium molecular weight polyvinylalcohol (Vinol 523, available from Air Products & Chemical Inc., Allentown, Pa.) was mixed with Syloid $74\times5500$ colloidal silica (available from W. R. Grace & Company, Davison Chemical Division, Baltimore, Md.) in the proportion 1.5 parts by weight pigment to 1 part by weight binder system following the coating preparation procedure of Example I. The coating composition thus formed was applied with a wire-wound Meyer rod onto a Domtar Diazo paper with a basis weight of 7.15 grams per square meter and a hercules sizing degree of about 900 seconds to achieve a resultant dry coating of about 20 microns thickness after drying for 1 minute with a hot air-gun blow drier such that the coating surface temperature was less than or equal to 100° C.

SAMPLE B: Fifty parts by weight of a primary binder system comprising 4 parts by weight of a low molecular weight polyvinylalcohol (Vinol 205) to 1 part by weight of a medium molecular weight polyvinylalcohol (Vinol 523) was blended with 50 parts by weight of a co-binder vinylpyrrolidone-vinylacetate copolymer (GAF E-635, available from GAF Corporation, Wayne, N.J.) and subsequently mixed with Syloid 74×5500 colloidal silica in the proportion 1.5 parts by weight pigment to 1 part by weight binder system following the coating preparation procedure in Example I and the coating application method outlined for the aforementioned SAMPLE A.

SAMPLE C: Fifty parts by weight of a primary binder system comprising 4 parts by weight of low molecular weight polyvinylalcohol (Vinol 205) to 1 part high molecular weight polyvinylalcohol (Vinol 523) was blended with 50 parts by weight of a co-binder polyvinylpyrrolidone (GAF K30, available from GAF Corporation, Wayne, N.J.) and subsequently mixed with Syloid 74×5500 colloidal silica in the proportion 1.5 parts by weight pigment to 1 part by weight binder system following the coating preparation procedure in Example I and the coating application method outlined in the aforementioned SAMPLE A.

SAMPLE D: Fifty parts by weight of a primary binder system comprising 4 parts by weight of a low molecular weight polyvinylalcohol (Vinol 205), to 1 part by weight molecular weight polyvinylalcohol (Vinol 523) was blended with 50 parts by weight of a styrene-maleic anhydride copolymer (Scripset 720, available from Monsanto, St. Louis, Mo.) and subsequently mixed with Syloid 74×5500 colloidal silica in the proportion 1.5 parts by weight pigment to 1 part by weight binder system following the coating preparation procedure in Example I and the coating application method outlined in the aforementioned SAMPLE A.

SAMPLE E: Fifty parts by weight of a primary binder system comprising 4 parts by weight of a low molecular weight polyvinylalcohol (Vinol 205), to 1 part by weight molecular weight polyvinylalcohol (Vinol 523) was blended with 50 parts by weight of a styrene vinylpyrrolidone copolymer (Antara 430, available from GAF Corporation, Wayne, N.J.) and subsequently mixed with Syloid 74×5500 colloidal silica in the proportion 1.5 parts by weight pigment to 1 part by weight binder system following the coating preparation procedure in Example I and the coating application method outlined in the aforementioned SAMPLE A.

The coated papers thus formed were then incorporated into a Xerox® 4020 piezo-electric transducer-based color ink jet printer with 240 by 120 (horizontal/vertical) spots per inch resolution. A bi-directional color test pattern comprising adjacent blocks of black and three primary colors (cyan, magenta, and yellow) was printed in solid areas with 100 percent coverage and in three secondary color overlapping areas (mixed primary colors of green, red, and violet) in solid areas with 200 percent coverage. Reflectance optical density measurements of the individual colors were measured with a Tobias Associates Inc. Model No. RCX densitometer. Reflectance optical density data for the test patterns printed on these two papers were as follows:

Reflectance Optical Density Data for Xerox 4020 Solid Area Color Prints

| Sample | Pigmented Coating/ Binder System | Black | Cyan | Magenta | Yellow |
|---|---|---|---|---|---|
| A | 100% PVOH | 1.71 | 1.63 | 0.93 | 0.92 |
| B | 50% PVOH + 50% vinyl pyrolidone-VA copolymer (GAF E-635) | 1.71 | 1.68 | 0.97 | 0.92 |
| C | 50% PVOH + 50% polyvinyl pyrrolidone (GAF K30) | 1.75 | 1.80 | 1.02 | 0.96 |
| D | 50% PVOH + 50% styrene-maleic anhydride copolymer (Monsanto Scripset 720) | 1.76 | 1.70 | 0.96 | 0.97 |
| E | 50% PVOH + 50% styrene-vinyl pyrrolidone copolymer (GAF Antara 430) | 1.78 | 1.80 | 0.99 | 0.99 |

Comparison of SAMPLE A, the control containing a binder comprising 100 percent polyvinyl alcohol, with SAMPLES B, C, D, and E indicates that the co-binder components in B, C, D, and E resulted in significant improvement in the optical density of the primary colors. In addition, there was a noticeable improvement in coating adhesion, namely scratch resistance, and chalking, namely resistance to removal of coating particles upon mechanical rubbing by the black rubber bale or platen roller of the printer, for SAMPLES B, C, D, and E compared with the control, SAMPLE A.

Other embodiments and modifications of the present invention may occur to those skilled in the art subsequent to a review of the information presented herein; these embodiments and modifications, as well as equivalents thereof, are also included within the scope of this invention.

What is claimed is:

1. A receiver sheet which comprises a paper substrate having a Hercules sizing degree of at least about 50 seconds and a basis weight of less than about 90 grams per square meter, and a coating which comprises a pigment and a binder comprising polyvinyl alcohol and an additional binder component selected from the group consisting of cationic polyamines, cationic polyacrylamides, cationic polyethyleneimines, styrene-vinyl pyrrolidone copolymers, styrene-maleic anhydride copolymers polyvinyl pyrrolidone, vinyl pyrrolidone-vinyl acetate copolymers, and mixtures thereof.

2. A receiver sheet according to claim 1 wherein the Hercules sizing degree of the paper substrate is from about 500 to about 1,000 seconds.

3. A receiver sheet according to claim 1 wherein the Stöckigt sizing degree of the paper substrate is at least about 30 seconds.

4. A receiver sheet according to claim 1 wherein the basis weight of the paper substrate is less than about 80 grams per square meter.

5. A receiver sheet according to claim 1 wherein the pigment is selected from the group consisting of silica, sodium aluminum silicate, calcium silicate, and mixtures thereof.

6. A receiver sheet according to claim 1 wherein the pigment has a surface area of from about 250 to about 400 square meters per gram.

7. A receiver sheet according to claim 1 wherein the pigment is present in the coating in an amount of from about 60 to about 75 percent by weight and the binder is present in the coating in an amount of from about 25 to about 40 percent by weight.

8. A receiver sheet according to claim 1 wherein the polyvinyl alcohol is present in the binder in an amount of from about 40 to about 55 percent by weight.

9. A receiver sheet according to claim 1 wherein the additional binder component is present in the binder in an amount of from about 45 to about 60 percent by weight.

10. A receiver sheet which comprises a paper substrate having a Hercules sizing degree of at least about 50 seconds and a basis weight of less than about 90 grams per square meter, and a coating which comprises a pigment and a binder comprising a mixture of polyvinyl alcohol, a styrene-butadiene latex and a cationic polyamine.

11. A receiver sheet according to claim 1 wherein the coating is present in a coating weight of from about 5 to about 15 grams per square meter.

12. A receiver sheet according to claim 1 wherein the coating is present in a thickness of from about 10 to about 30 microns.

13. A receiver sheet which comprises a substantially transparent substrate and a coating which comprises a pigment and a binder comprising polyvinyl alcohol and an additional binder component selected from the group consisting of cationic polymers, styrene-vinyl pyrrolidone copolymers, styrene-maleic anhydride copolymers, polyvinyl pyrrolidone, vinyl pyrrolidone-vinyl acetate copolymers, and mixtures thereof.

14. A receiver sheet according to claim 13 wherein the substantially transparent substrate is of a material selected from the group consisting of polyester, polycarbonates, polysulfones, cellulose triacetate, polyvinyl chloride, cellophane, polyvinyl fluoride, and mixtures thereof.

15. A receiver sheet according to claim 13 wherein the pigment is selected from the group consisting of silica, sodium aluminum silicate, calcium silicate, and mixtures thereof.

16. A receiver sheet according to claim 13 wherein the pigment has a surface area of from about 250 to 400 square meters per gram.

17. A receiver sheet according to claim 13 wherein the pigment is present in the coating in an amount of from about 60 to about 75 percent by weight and the binder is present in the coating in an amount of from about 25 to about 40 percent by weight.

18. A receiver sheet according to claim 13 wherein the polyvinyl alcohol is present in the binder in an amount of from about 40 to about 55 percent by weight.

19. A receiver sheet according to claim 13 wherein the additional binder component is present in the binder in an amount of from about 45 to about 60 percent by weight.

20. A receiver sheet which comprises a substantially transparent substrate and a coating which comprises a pigment and a binder comprising a mixture of polyvinyl alcohol, a styrene-butadiene latex and a cationic polyamine.

21. A receiver sheet according to claim 13 wherein the coating is present in a coating weight of from about 5 to about 15 grams per square meter.

22. A receiver sheet according to claim 13 wherein the coating is present in a thickness of from about 10 to about 30 microns.

23. A receiver sheet which comprises a paper substrate having a Hercules sizing degree of at least about 50 seconds and a basis weight of less than about 90 grams per square meter, and a coating which comprises a pigment and a binder comprising a mixture of polyvinyl alcohol and a styrene-butadiene latex.

24. A receiver sheet which comprises a substantially transparent substrate and a coating which comprises a pigment and a binder comprising a mixture of polyvinyl alcohol and a styrene-butadiene latex.

* * * * *